US 6,654,551 B1

(12) United States Patent
Stabile et al.

(10) Patent No.: US 6,654,551 B1
(45) Date of Patent: Nov. 25, 2003

(54) SAFETY PANEL FOR HIGH-EFFICIENCY HEATING BY ELECTRICITY

(75) Inventors: Aldo Stabile, Crema (IT); Bruno Ceraso, Milan (IT)

(73) Assignees: Cadif SRL, S. Giovanni Lupatoto (IT); Cedal SRL, Milan (IT)

( * ) Notice: Subject to any disclaimer, the term of this patent is extended or adjusted under 35 U.S.C. 154(b) by 0 days.

(21) Appl. No.: 10/110,903

(22) PCT Filed: Dec. 20, 1999

(86) PCT No.: PCT/IT99/00414
§ 371 (c)(1),
(2), (4) Date: Apr. 18, 2002

(87) PCT Pub. No.: WO01/35700
PCT Pub. Date: May 17, 2001

(30) Foreign Application Priority Data

Nov. 9, 1999 (IT) .......................................... MI99A2336

(51) Int. Cl.⁷ ................................................. H05B 3/20
(52) U.S. Cl. ....................................... 392/435; 392/437
(58) Field of Search ................................ 392/435, 436, 392/437, 416; 219/213, 388, 544, 385, 443.1, 465.1, 685

(56) References Cited

U.S. PATENT DOCUMENTS

| | | | | |
|---|---|---|---|---|
| 2,842,651 A | * | 7/1958 | Neely | 219/530 |
| 4,866,252 A | * | 9/1989 | Van Loo et al. | 219/535 |
| 5,013,889 A | | 5/1991 | Bakke | |
| 5,804,791 A | | 9/1998 | Gelus | |

* cited by examiner

Primary Examiner—Teresa Walberg
Assistant Examiner—Vinod D. Patel
(74) Attorney, Agent, or Firm—Michael J. Striker

(57) ABSTRACT

Panel (10) for heating by an electric resistance obtained from a serpentine (55) of highly conductive material formed of a thin continuous strip of constant width, having a high ratio between width and thickness, that generates radiant heat by means of electromagnetic waves, placed inside a flat metal chamber (96) given a hermetic seal by continuous welds (90–95) along all its joins, obtained from a basic rectangular tray-shaped structure (11) and from similarly tray-shaped closing structures (80, 81) placed side by side in the basic structure (11).

15 Claims, 8 Drawing Sheets

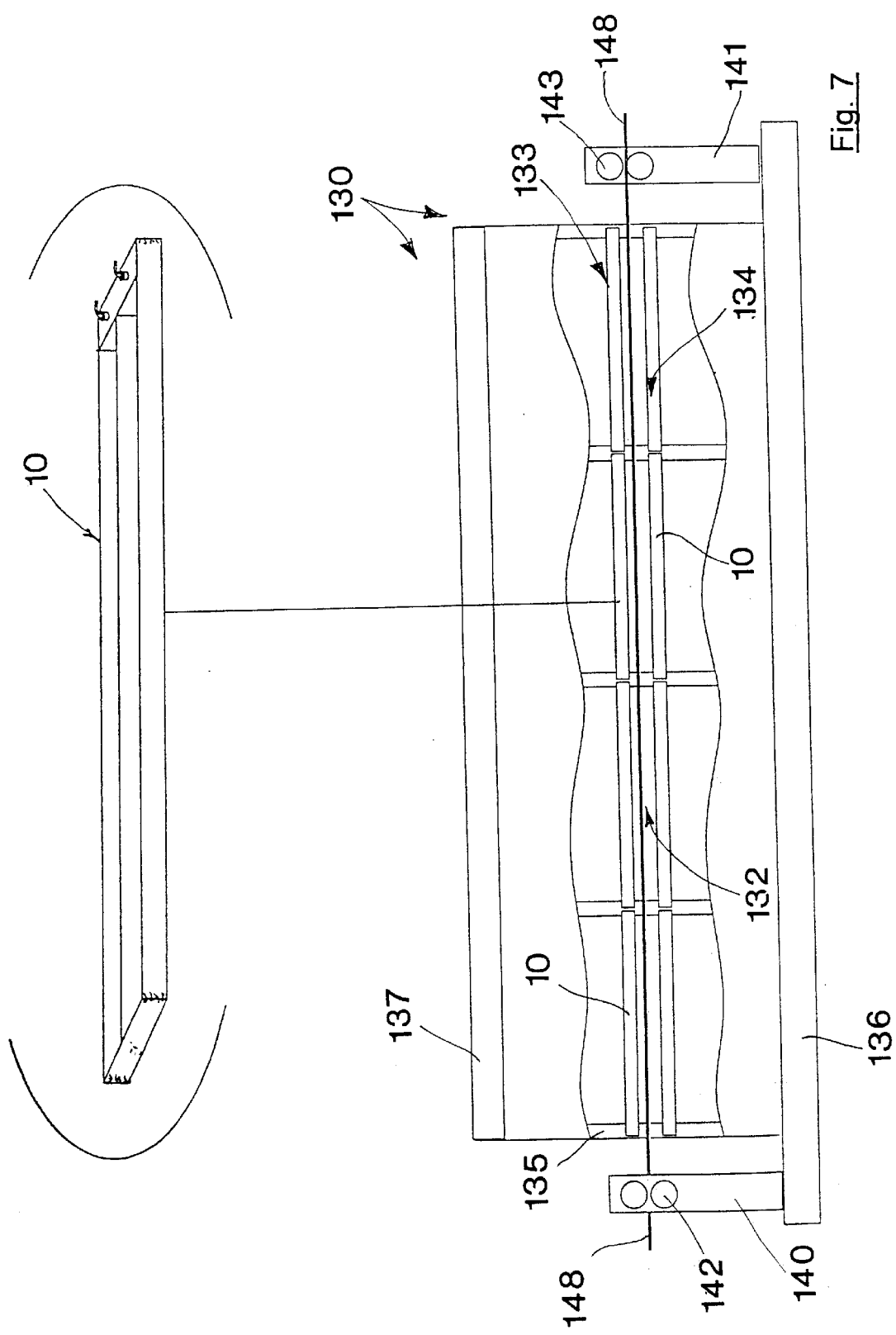

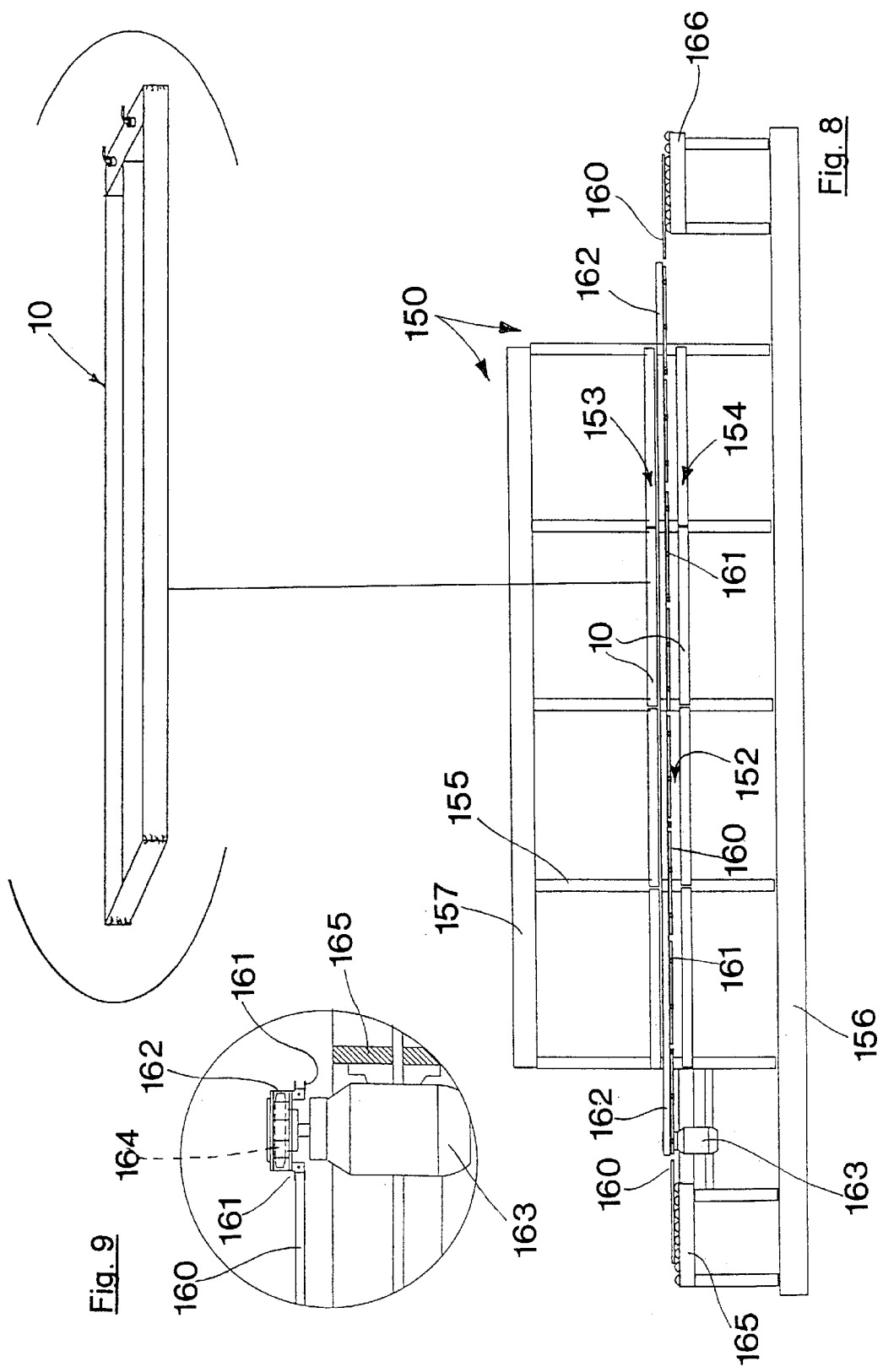

SAFETY PANEL FOR HIGH-EFFICIENCY HEATING BY ELECTRICITY

The invention concerns electric generators of heat.

There are countless processes and types of apparatus for generating heat all based essentially on the combustion of gas, fuel oil and coal, and on electric resistances.

The thermal chain so set up conditions the thermal efficiency of these heating systems.

Heat may be produced in a boiler or oven and is transferred from there, by means of a diathermic liquid such as water or oil, to a central heating plant that supplies warmth to indoor areas or rooms, or to the bodies to be heated by conduction or convention.

In the first case the heater must be placed in contact with the body to be heated.

In the second case heat from the hotter body is passed into the environment or to the body to be heated by some fluid. such as air for example.

The heating device must have a large surface area to enable great quantities of heat to be emitted at a low thermal head in order to avoid overheating the walls of the device which would damage the fluid circulating inside.

The diathermic liquids must posses certain characteristics, above all that of maintaining stability at a high temperature.

For temperatures up to 310–350° C. mineral oils are often used today in the form of high-boiling fractions of oil refined to remove unsaturated substances that might become polymerized, while special additives are put in to improve thermal stability so interrupting chain reactions and cracking.

The mode of radiancy transfers heat from the hot body to the colder body by means of electromagnetic waves.

This mode is usually realized by electric heating elements that transform electric energy into thermal energy.

To assist radiancy metal reflectors are used to diffuse heat rays but efficiency is generally lower than diffusion by other methods as the electric elements reach very high temperatures and heat the air closest to them so setting up a convective movement.

With the methods described it will be clear that there is considerable loss of heat along the thermal chain, especially on account of the great differences in temperature between the flame or electric heating elements and that of the body to be heated, the actual quantity of energy used, compared with that available, therefore being very low.

Generation of heat by radiancy through emission of electromagnetic waves creates a risk of deflagration especially in installations where inflammable substances in the gaseous or aeriform state are present.

From the foregoing it will be seen that present methods of creating radiancy are expensive, low in efficiency and possibly dangerous. The above invention permits heat* to be generated achieving a much higher level of efficiency than that possible with other methods, eliminating all danger and offering other considerable advantages as will be explained below.

*The prior patent U.S. Pat. No. 5,804,791 describes a heating structure to be placed in a sandwich-type apparatus, comprising a nichel-chrome or constantan electric resistance substantially embedded in a body of thermoplastic resins, inserted between two rigid elements at least one of which acts as a heating plate.

When applied to a flat iron, the vaporizing chamber is rendered hermetic, in relation to said heating structure, by silicon joints.

It will be clear that such joints cannot adequately withstand high mechanical and thermal stresses and this would make it impossible to use a heating structure of the kind in environments, or in appliances where inflammable substances or gases are present, due to serious risks of causing a deflagration.

Subject of the invention is a heating device having an electric resistance placed inside a hermetically sealed structure of the sandwich-type, comprising two rigid elements one of which acts as a heating plate.

The electric resistance takes the form of a serpentine and consists of a highly conductive strip of thin material of constant width, the ratio between width and thickness being substantially 10 to 20, that forms a number of U-shaped bends, passed through by a series of parallel and transversal strips of mica.

The serpentine lies between two sheets of mica inside the chamber of a rectangular substantially box-shaped panel, the basic structure being that of a tray having one or more tray-like closing structures inserted side by side inside said basic structure.

The external length of said closing structures corresponds to the internal length of the basic structure less the width of a rectangular supporting plate connecting, by means of hermetically sealed bushes, to the electric feed wiring of the serpentine.

The overall external width of said closing structures laid side by side corresponds to the internal width of said basic structure, while the external height of each of said closing structures corresponds to the internal height of said basic structure less the overall thickness of the serpentine, of the sheets and of the transversal strips of mica.

Said basic structure and each of said closing structures are each formed of a rectangular metal sheet bent at 90° at the four sides and joined at the corners by continuous welding.

Continuous welding is carried out on all edges of the basic and closing structures and on the upper face of said rectangular plate matching and practically lying on one and the same geometrical plane.

The effect of all this is to ensure that the chamber of the panel is hermetically sealed and that its free volume is insufficient to receive a quantity of inflammable gaseous substances such as could provoke a deflagration.

The first transversal strip of mica at the bends in the serpentine passes under the first and over the second element of each successive bend as far as the opposite side of said serpentine.

The second strip passes, at a short distance from the first, over the first and under the second element of each successive bend until it reaches the opposite side of the serpentine.

The third and fourth strips follow paths respectively similar to those of the first and second strips, and so on to complete the serpentine. The serpentine can advantageously be made of copper or brass.

Thickness and width of the serpentine are advantagously of about 0.5 mm and 7 mm respectively.

A continuous vertical oven for polymerization comprising the devices for heating by panels and electric resistances as described, presents a vertical structure, two parallel chambers placed side by side consisting of a series of panels aligned on parallel opposing geometrical planes, inside which an impregnated band passes, said band unwinding from a reel at the entry to the oven and, after polymerization, winding onto a reel at the exit from the oven.

A continuous horizontal oven for polymerization, comprising the devices for heating as described, presents a chamber formed of a parallel opposing pair of two sets of aligned panels, inside which an impregnated band passes, said band unwinding from a reel at the entry to the oven and, after polymerization, winding onto a reel at the exit from the oven.

A continuous horizontal oven for polymerizing sheets of copper or other material treated with paints, inks and the like, comprising the heating devices described above, presents a chamber formed of a parallel opposing pair of two sets of aligned panels, and a continuous chain fitted with pincers which, by suitable automatic means, pick up the sheets one at a time from a bed at the entry to the oven and carry them inside said chamber.

In another execution said oven presents a chamber, formed of a parallel opposing pair of two sets of aligned panels, inside which passes a bend of a continuous conveyor belt supported at the two ends, where it enters and leaves the oven, by two rollers one motor driven, enabling said sheets to be deposited one after another on said belt.

A static oven comprising the heating devices as described presents the panels applied to all or some of the walls of said oven, such walls also including the roof and the floor.

A bath for heating, comprising the heating devices as described, presents the panels applied to all or some of its internal walls, such walls also including the roof and the bottom.

A tank for heating, comprising the heating devices described, presents the panels applied to all or some of its internal walls, such walls also comprising the bottom.

A hotplate, comprising the heating devices as described, presents the panels applied to the surface of the hotplate to be used for heating or cooking various substances.

A generator of heat for rooms in buildings generally, comprising the heating devices as described, is formed from one or more units of said panels.

The invention offers evident advantages.

By placing the serpentine, that transforms electrical energy into thermal energy, inside a hermetically sealed metal chamber, of a size substantially the same as that of said serpentine with its sheets of mica, and creating said hermetic seal by continuous welds along all the matching edges of the parts forming said chamber, the described panels can also be used in installations and in places where the risk of deflagration exists due to the presence of inflammable gaseous substances.

Heat is generated by electric current already diffused and therefore at the temperature required for carrying out the processes without any need for diffusers, providing a much higher level of efficiency compared with that obtainable with materials well known to be classified as resistive.

In this latter type of material the electrones strongly resist separation from the core this being the effect of passage of electric current.

In highly conductive materials such as copper, brass and the like used in this present patent application, the electrones offer far less resistance to separation from the core such as is caused by passage of electric current.

As emission of heat is linked to the path taken by the electrones, it follows that transformation of electric energy into thermal energy using highly conductive materials of suitable dimensions, takes place at a considerably higher level of efficiency than that achievable with ordinary resistive materials.

From the above it will be seen that subject panels present two basic characteristics:

- a degree of efficiency much greater than that of ordinary generators of heat for transformation of electric energy;
- complete safety from deflagration making them usable in practically any installation and in any environment.

The fact of obtaining a method of high-efficiency heating by electricity, one that is free from risk, even in places where deflagration may occur, means that the invention here described can be used with all the advantages pertaining to electric heating, namely maximum possibility of adjustment, easy installation, very low bulk and weight compared with other forms of heating.

The above also shows that these panels provide an interesting application in impregnating systems, in ovens for drying and for polymerizing paints and inks as well as in a wide range of installations and equipment.

Particularly in the fields of impregnating means for polymerization of bands for printed circuits, great importance is attached to the drastic reduction in waste, as seen in FIGS. 5 and 6 respectively relating to radiographic pictures of bands made either with the usual method of heating or with heating by the panels subject of the invention.

Characteristics and purposes of the disclosure will be made still clearer by the following examples of its execution illustrated by diagrammatically drawn figures.

FIG. 1 The panel with electric serpentine in a sealed chamber, with detail, in perspective.

FIG. 2 An exploded perspective of the panel, with cut-away detail.

FIG. 3 The serpentine, with detail, in perspective.

FIG. 4 Vertical oven for polymerizing a fiberglas band, made using a set of the described panels, front view with perspective detail of one panel.

FIG. 5 Radiographic picture of a piece of impregnated band after polymerization by a traditional means of heating.

FIG. 6 Radiographic picture of a piece of impregnated band after polymerization using a set of panels subject of the invention.

FIG. 7 Front view of a horizontal oven for polymerizing an impregnated band, made with a set of the described panels, and detail of one panel in perspective.

FIG. 8 Front view of a horizontal oven for polymerizing sheets of copper and the like treated with paints, inks and other substances, showing chain and pincers, made with the described panels, and detail of one panel in perspective.

FIG. 9 Detail of the oen in FIG. 8, side view.

FIG. 10 Front view of a horizontal oven for polymerizing sheets of copper and the like treated with paints, inks and other substances, showing the conveyor belt, made with the described panels, and detail of one panel in perspective.

The panel 10 comprises a basic metal structure 11 in a single tray-shaped rectangular piece, with a bottom 12 and sides 13, formed by bending at 90° the metal sheet from which said base is formed, and with welds 15 at the corners 14.

The insulating sheet 20 of mica is laid on said bottom 12.

Over said sheet 20 the electrical complex 30 is laid, this comprising the serpentine 55 with contacts 50 and 51 fixed to the opposing oblong terminals 31, 32 connected by the insulating bridge 34 and pins 35.

On top of the terminals are screws 36 to hold the ends of the electric wires 40 which connect to the main electric feed passing through the bushings 42, sealed against deflagration, inserted into holes made for them in a crosswise rectangular plate 43 whose internal length corresponds to the internal width of the basic structure 11.

A set of parallel strips 60, 61 of mica and others laid crosswise are inserted into said serpentine 55.

As seen in the detail in FIG. 3, the first strip 60 passes under the first part of a bend 70 in the serpentine, over the second part of said bend 70, under the first part of the next bend 71, over the second part of said bend 71, under the first part of a successive bend 72 and so on as far as the opposite side of the serpentine.

At a short distance from the first strip, a second strip 61 passes over the first part of the bend 70 in the serpentine, under the second part of said bend, over the first part of the next bend 71, under the second part of said bend 71, over the first part of a bend 72 and so on to reach the opposite side of the serpentine.

The third strip follows the same route as the first one, while the fourth strip follows that of the second strip, and so on to the end of the set of parallel strips.

A second sheet 21 of mica is laid over the described serpentine.

Over said second sheet of mica, the two closing tray-shaped structures 80 and 81 are laid, placed side by side lengthwise.

The sum of the widths of said two structures 80, 81 corresponds to the internal widith of the structure 11, while the length of said structures 80, 81 corresponds to the internal length of said basic structure 11, less the width of the rectangular plate 43.

Each of the structures 80, 81 is obtained from a metal sheet that forms the bottom 85 bent to 90° at the sides, to form the sides 86 closed by welds 88 at the corners 87 where they join.

The external height of the sides of said structures 80,81 corresponds to the depth of the basic structure 11 less the sum of the thickness of the sheets of mica 20 and 21 and of the serpentine 55 with its strips like strips 60, 61.

On completion of assembly the panel 10 appears as shown in FIG. 1. The upper edge of the basic structure 11, of the closing structures 80, 81 and the upper face of the plate 43 lie substantially on the same geometrical plane and all their edges, like 90–95, are welded.

These welds ensure a total hermetic seal for the chamber 96 (detail in FIG. 1), so created between the basic structure 11 and the closing structures 80, 81.

As the height of chamber 96 corresponds to the sum of those of the sheets of mica 20 and 21, of the serpentine 56 and of the crosswise strips like 60, 61, the free volume in said chamber is so very small that, even in the event of infiltration of explosive gases during a heating process, the quantity of said gases would be insignificant and an explosion would be impossible.

The serpentine 55 is made of highly conductive material such as copper, brass and the like.

Resistance to passage of the current needed to transform electric energy into thermal energy and its diffusion, is determined by the dimensions of said serpentine, namely by its very slight thickness, about 5 mm, by its great width and by its length.

FIG. 4 shows an example of application of the panels 10 in an oven for polymerization 100.

Said oven presents the structure 101 that supports the pulley 102 around which the fiberglas band 105 unwinds, said band being impregnated with resin so that it will receive sufficient heat for polymerization when passing through the chambers 106,107.

Heat is transmitted by electromagnetic waves from the panels 10.

Transformation of the solvent in gaseous substances, possessing characteristics which may even be explosive, need give no cause for concern as the panels provide safety against deflagration.

These panels not only increase efficiency and avoid danger, but also permit greater radiancy by means of electromagnetic waves that first act substantially in the central part of the body to be polymerized and then on its surface.

Many of the presently used heating systems act in the opposite way, first on the surface of the body and then inside it; this leads to drawbacks because the polymerized surface material hinders penetration of heat inside the body creating bubbles and other irregularities. Especially in parts for printed circuits, these bubbles cause much damage preventing the parts from operating properly.

FIG. 5 shows a radiography of a piece of band 120 polymerized by ordinary convection systems, the bubbles 122 being clearly visible especially among the fiberglass fibres 121.

FIG. 7 illustrates a polymerization oven 130 substantially similar to that seen in FIG. 4, but operating horizontally.

Figure 1:
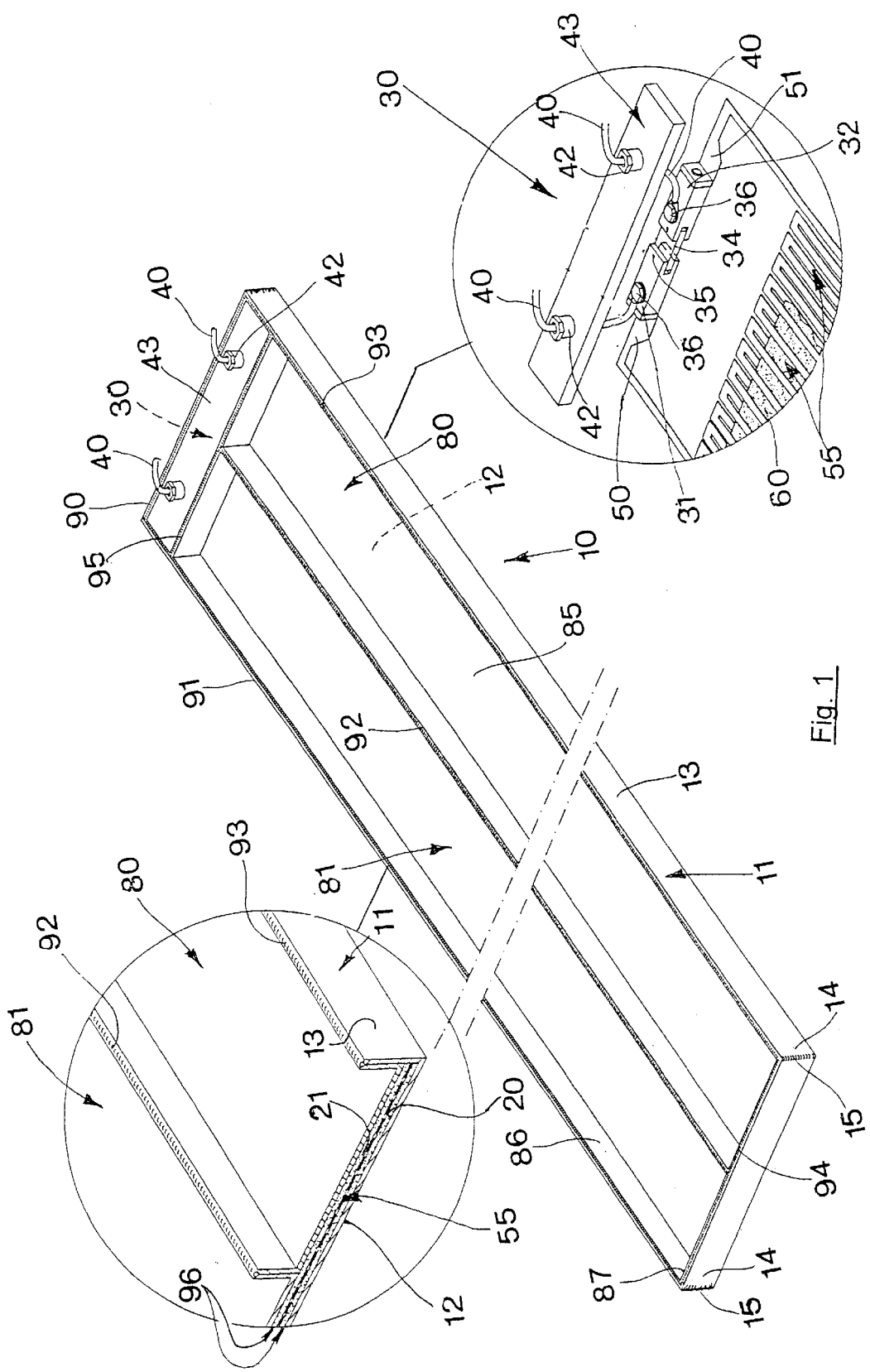
Figure 2:
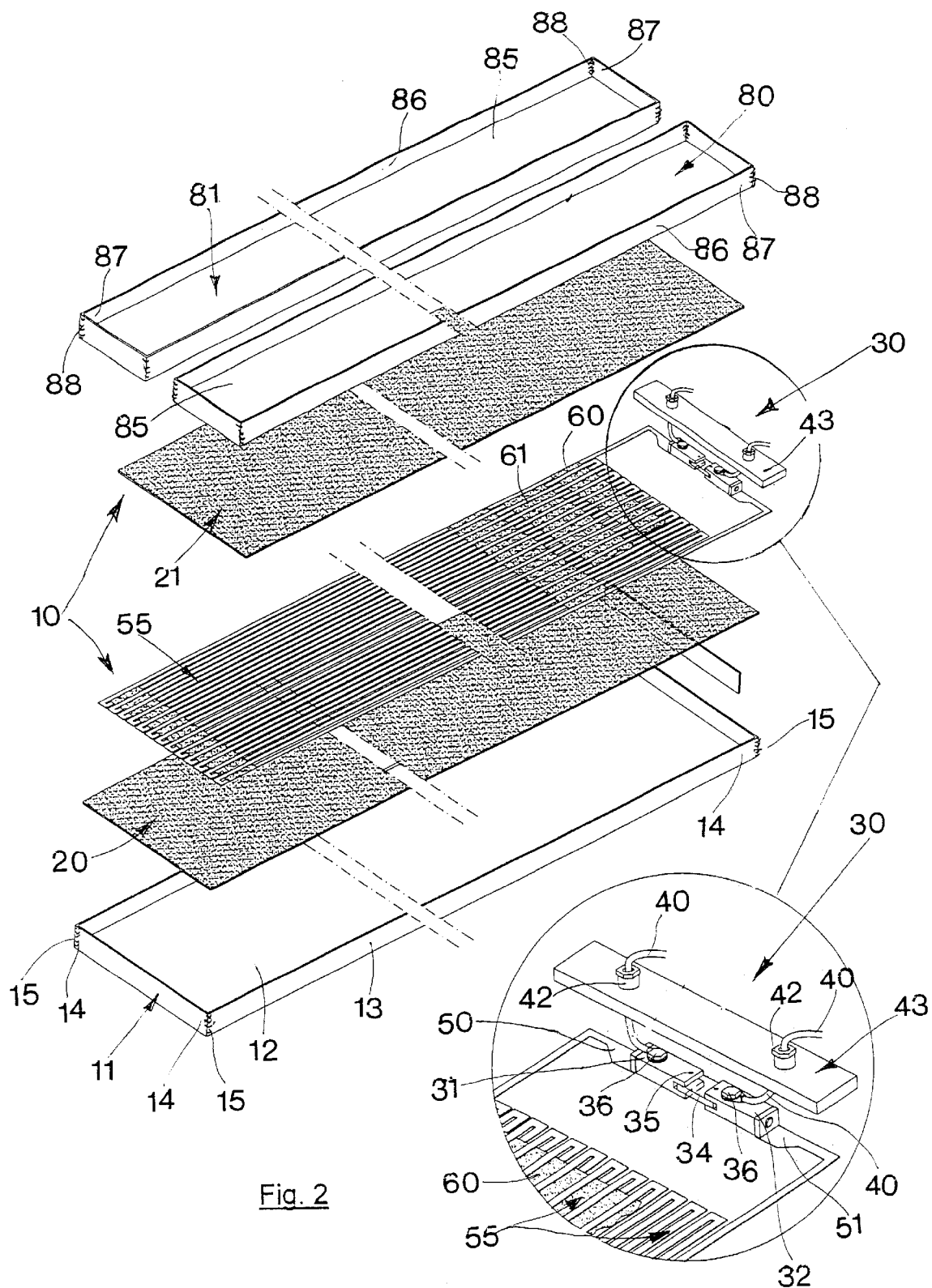
Figure 3:
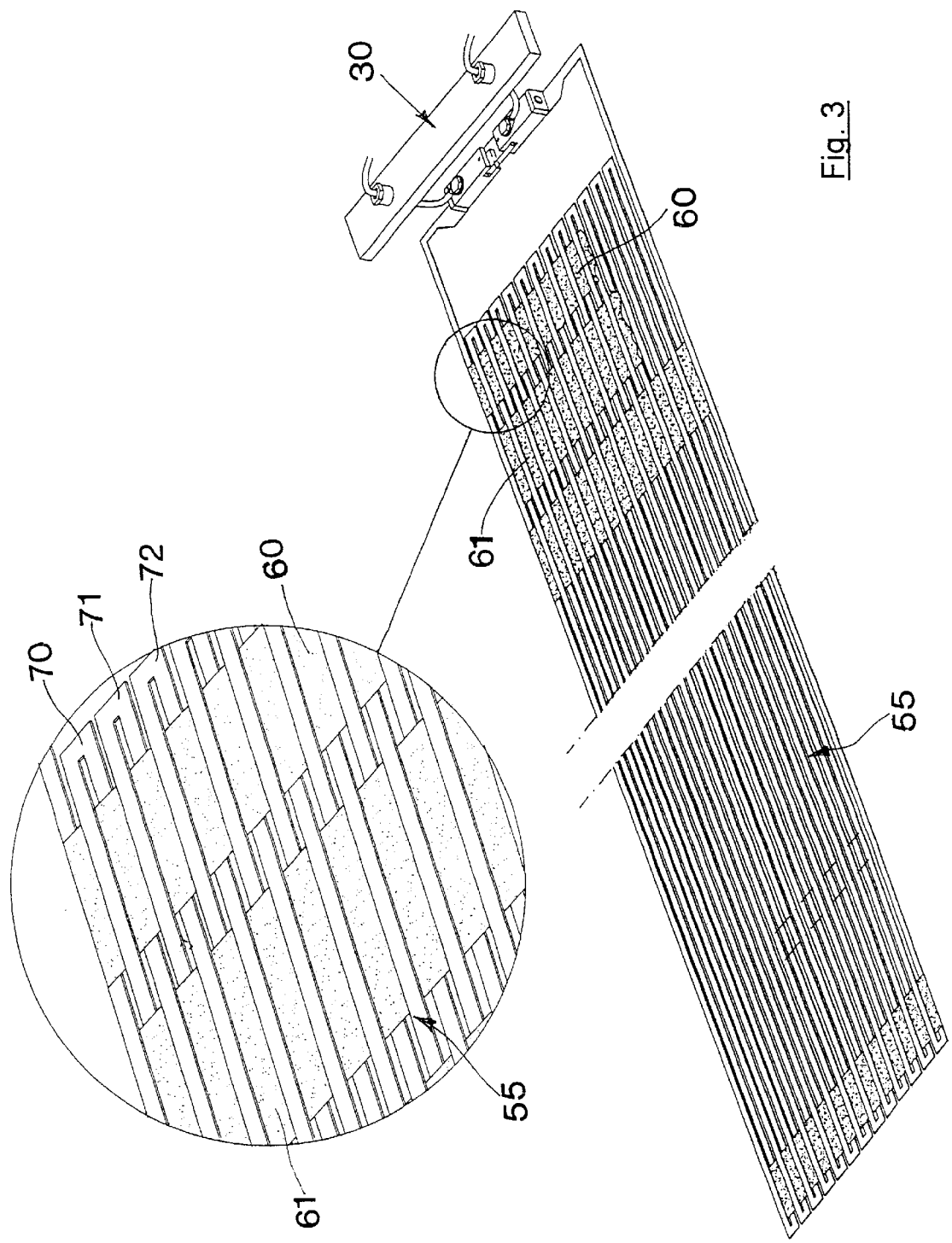
Figure 4:
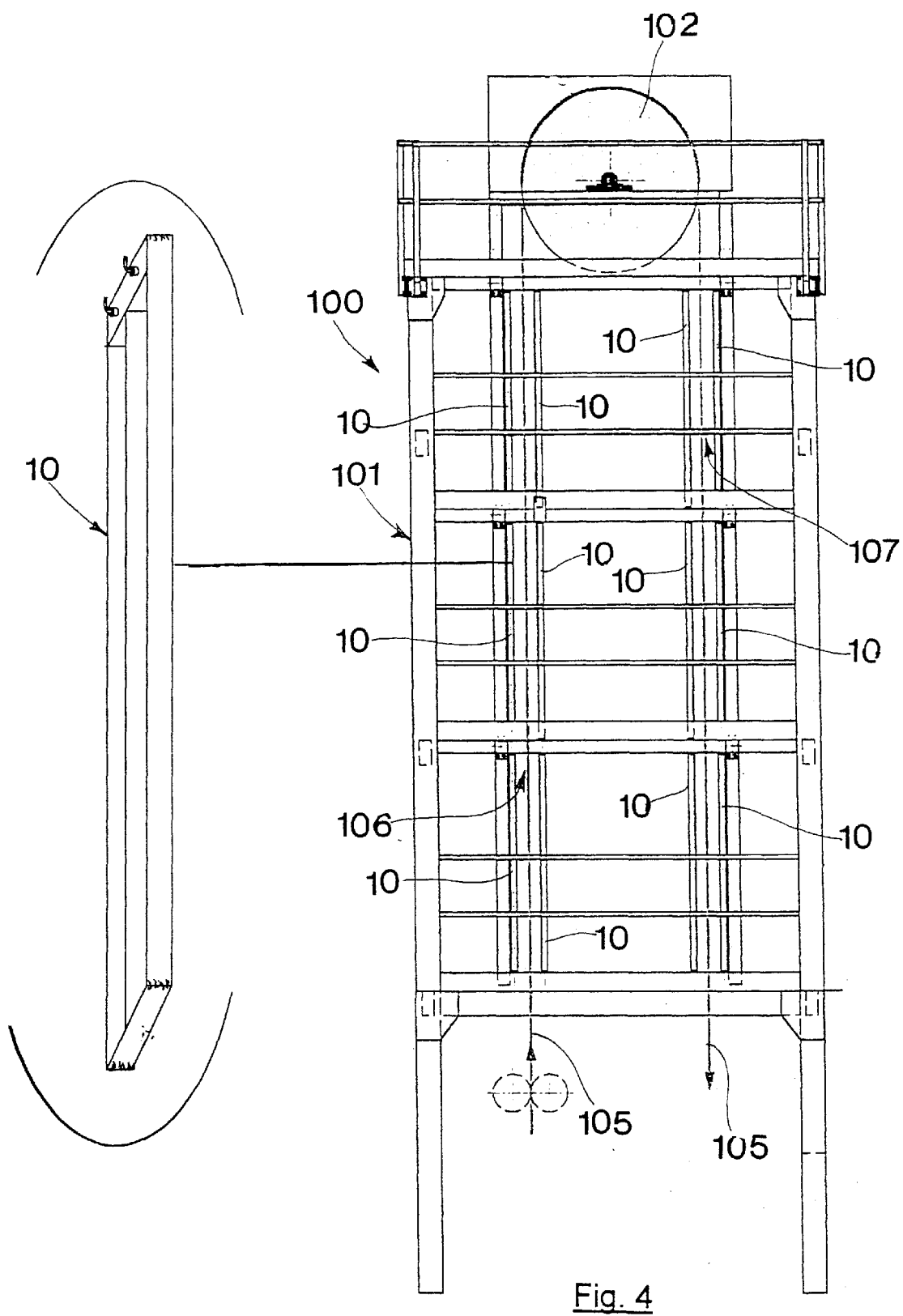
Figure 5:
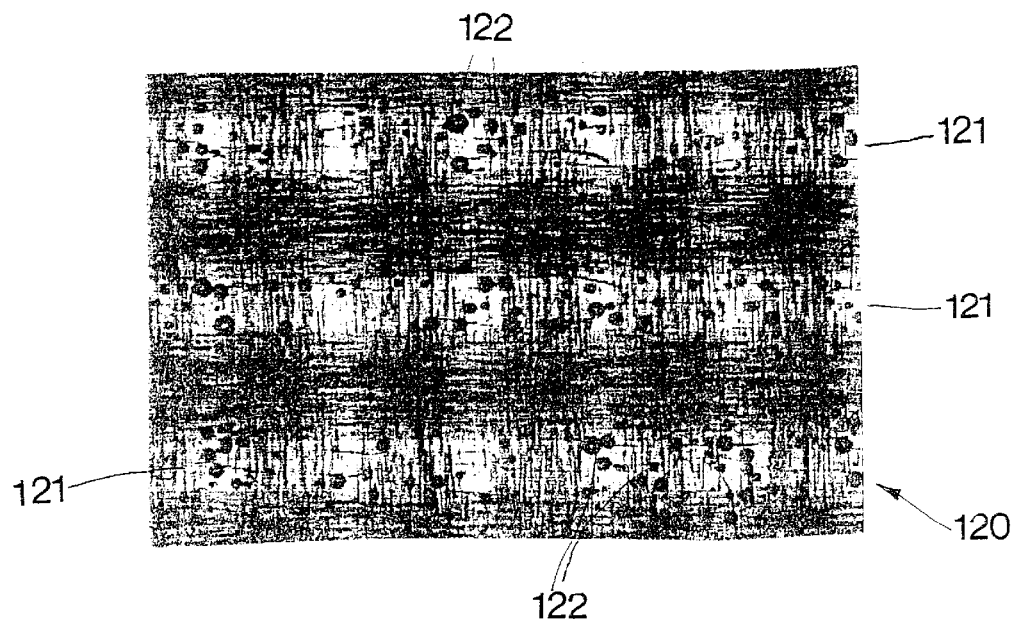
Figure 6:
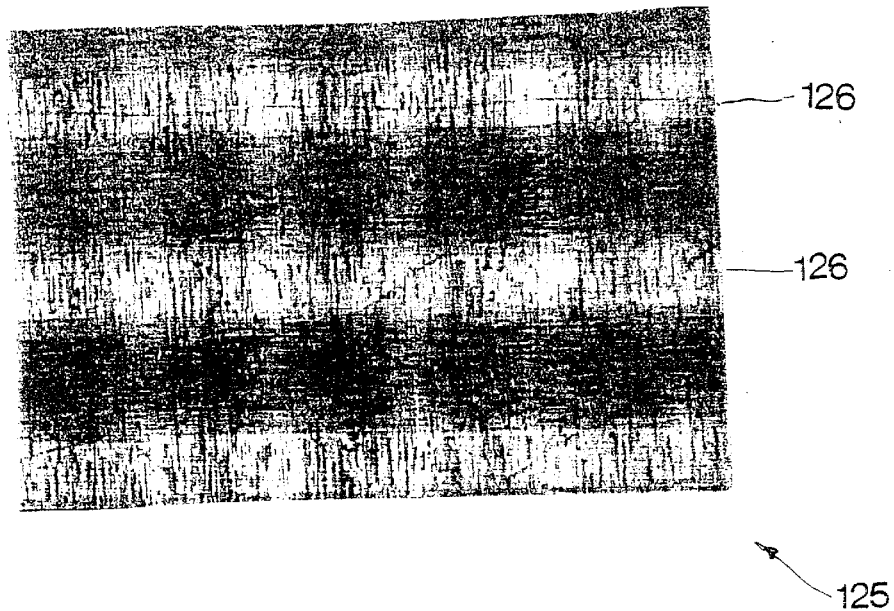
FIG. 6 shows a radiography of a band 125 polymerized by the panels subject of the invention where no bubbles or other imperfections can be found among the fiberglas fibres 126.

The chamber 132 in the oven 130 is formed of two sets 133,134 of panels 10 like those already described, aligned on two opposite geometrical planes, and is supported by uprights 135 fixed below to the base 136 and, at the top, to the head 137.

The supports 140 and 141 at entry and exit to the chamber 132, carry the pairs of rollers, respectively to guide 142 and pull 143 the band 148 to be polymerized.

FIG. 8, front view, with side view detail FIG. 9, illustrates a horizontal polymerization oven 150 for sheets of copper or other material treated with paints, inks and the like.

The chamber 152 in the oven 150 is formed of two sets 153 and 154 of panels 10, like those described, aligned above and below, and is supported by the uprights 155 fixed to the base 156. and above, to the head 157.

The painted copper sheets, like 160, placed on the bed with the roller surface 165, are drawn along by a set of pincers 161 supported by two continuous chains, like 162, placed parallel between them, at the two longitudinal ends of the oven 150, and operated by electric ratiomotors 163 through gear wheels 164.

The painted sheets 160 are picked up by the pincers 161 and carried along by the continuous parallel chains 162 to the exit from the chamber 152, and there laid on the bed with roller surface 166.

Figure 10:
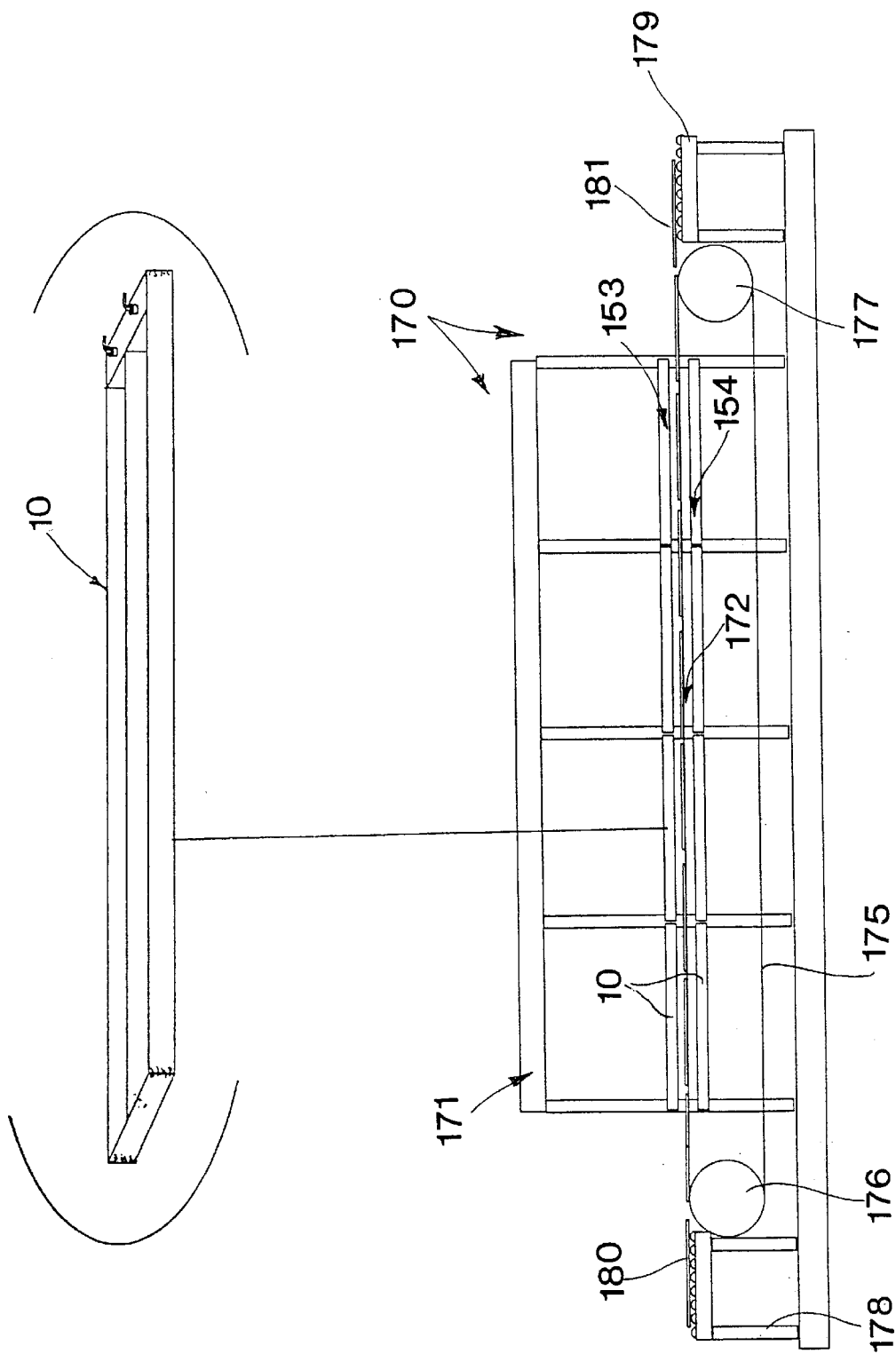

FIG. 10 illustrates a polymerization oven 170 substantially similar to the oven 150 already described, in which is a chamber 172 formed of two aligned and opposing sets 153, 154 of panels 10, like those described, supported by a structure 171 similar to the structure 151 described earlier.

Said structure 171 carries a conveyor belt 175 supported at its two ends by rollers 176 and 177 situated at the beginning and end of said structure 171.

The beds 178 and 179, with roller surfaces, respectively support the painted sheets to be polymerized, like sheet 180, and those already polymerized, like sheet 181.

Sheets 180 to be polymerized are laid one after another on the conveyor belt 175 that draws them inside the chamber 172 and, after polymerization, carries them to the exit onto the bed 179.

What is claimed is:

1. Heating device with an electric resistance placed inside a sandwich-type hermetically sealed structure, comprising two rigid elements one of which acts as a heating plate, characterized in that the electric resistance is a serpentine consisting of a thin strip of highly conductive material of a constant width, the ratio between width and thickness being substantially 10 to, formed of a series of U-shaped bends, crossed by a series of parallel transversal strips of mica said serpentine being lodged between two sheets of mica, inside the chamber of a rectangular substantially box-shaped panel resulting from a basic tray-shaped structure and from one or more similarly tray-shaped closing structures, inserted side by side within said basic structure, the external length of said dosing structures corresponding to the internal length of the basic structure less the width of a rectangular supporting plate, by means of hermetically sealed bushes, to the electric feed wiring of the serpentine, the overall external width of said closing structures, placed side by side, corresponding to the internal width of said basic structure and the external height of each of said closing structures to the internal height of said basic structure less the overall thickness of the serpentine, of the sheets and of the transversal mica strips, each formed of a rectangular metal sheet bent at 90° at the four sides with continuous weldings being done on all edges of the basic structure and closing strictures, and on the upper face of said rectangular plate, matching and substantially lying on one and the same geometrical plane, the effect of all this being to provide a hermetic seal for the chamber of the panel and a free volume insufficient for receiving a quantity of inflammable gaseous substances that could lead to a deflagration.

2. Heating device as in claim 1, characterized in that the first of the mica strips transversal to the bends of the serpentine passes under the first and over the second element of each successive bend as far as the opposite side of said serpentine, in that the second strip passes, at a short distance from the first above the first element and under the second of each successive bend as far as the opposite side of said serpentine, in that the third and the fourth strips follow a path respectively similar to that of the first strip and of the second strip, and so on until the end of the serpentine.

3. Heating device as in claim 1, characterized in that the serpentine is made of copper.

4. Heating device as in claim 1, characterized in that the serpentine is made of brass.

5. Heating device as in claim 1, characterized in that thickness of the serpentine is substantially 0.5 mm.

6. Heating device as in claim 1, characterized in that width of the strip that forms the serpentine is substantially 7 mm.

7. Continuous vertical oven for polymerization comprising the heating devices with panel and electric resistance as in claim 1, characterized in that it presents two parallel chambers each formed of pairs of parallel opposing sets of aligned panels inside which is made to pass an impregnated band that unwinds from a reel at entry to the oven and, after polymerization, winds onto a reel at the exit from the oven.

8. Continuous vertical oven for polymerization comprising the heating devices with panel and electrical resistance as in claim 1, characterized in that it presents a chamber formed of a pair of parallel opposing sets of aligned panels inside which an impregnated band is made to pass, unwinding from a reel at the entry to the oven and, after polymerization, winding onto a reel at the exit from the oven.

9. Continuous horizontal oven for polymerizing sheets of copper or other material treated with paints, inks and the like, comprising the heating devices and panel and electric resistance as in claim 1, characterized in that it presents a chamber formed of a pair of parallel opposing sets of aligned panels and a continuous chain fitted with a princer which, with suitable automatic means, picks up the sheets of one by one from a bed at the beginning of the oven and carries them inside said chamber.

10. Continuous horizontal oven for polymerizing sheets treated with paints, inks and the like comprising the heating devices with panel and electrical resistance as in claims 1, characterized in that it presents a chamber formed of a pair of parallel opposing sets of aligned panels, inside which passes a bend in a continuous conveyor belt supported at the two ends at entry and exit from the oven by two rollers, one of which is motor driven, enabling said sheets to be deposited one at a time on said belt.

11. Static oven comprising the heating devices with panels and electric resistance as in claim 1, characterized in that the panels are applied to all or some of the walls of said oven, such walls also comprising the roof and the floor.

12. Bath for heating comprising the heating devices with panels and electric resistance as in claim 1, characterized in that the panels are placed on all or some of the internal walls of said bath, such walls also comprising the bottom.

13. Tank for heating comprising the heating devices with panels and electric resistance as in claim 1, characterized in that the panels are placed on all or some of the internal walls of said tank, such walls also comprising the bottom.

14. Hotplate comprising the heating devices with panels and electric resistance as in claim 1, characterized in that the panels are applied to the surface of the hotplate to be used for heating or cooking substances.

15. Generator of heat for rooms in buildings generally comprising the heating devices with panels and electric resistance as in claim 1, characterized in that it is formed of one or more units of the panels.

* * * * *